(12) United States Patent
Risvik et al.

(10) Patent No.: US 9,424,351 B2
(45) Date of Patent: Aug. 23, 2016

(54) HYBRID-DISTRIBUTION MODEL FOR SEARCH ENGINE INDEXES

(75) Inventors: Knut Magne Risvik, Mo I Rana (NO);
Michael Hopcroft, Kirkland, WA (US);
John Bennett, Bellevue, WA (US);
Karthik Kalyanaraman, Bellevue, WA (US); Trishul Chilimbi, Seattle, WA (US); Chad P. Walters, Bellevue, WA (US); Vishesh Parikh, Redmond, WA (US); Jan Otto Pedersen, Los Altos, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 12/951,815

(22) Filed: Nov. 22, 2010

(65) Prior Publication Data
US 2012/0130997 A1    May 24, 2012

(51) Int. Cl.
*G06F 7/00* (2006.01)
*G06F 17/30* (2006.01)

(52) U.S. Cl.
CPC ...... *G06F 17/30864* (2013.01); *G06F 17/3053* (2013.01); *G06F 17/30194* (2013.01); *G06F 17/30442* (2013.01)

(58) Field of Classification Search
CPC .................. G06F 17/30864; G06F 17/30442; G06F 17/30194; G06F 17/3053
See application file for complete search history.

(56) References Cited

U.S. PATENT DOCUMENTS

| 4,769,772 A | 9/1988 | Dwyer |
| 5,193,180 A | 3/1993 | Hastings |
| 5,640,487 A | 6/1997 | Lau et al. |

(Continued)

FOREIGN PATENT DOCUMENTS

| CN | 1517914 | 8/2004 |
| CN | 1670723 | 9/2005 |

(Continued)

OTHER PUBLICATIONS

Ganti, et al., "Precomputing Search Features for Fast and Accurate Query Classification," In: Third ACM International Conference on Web Search and Data Mining, Feb. 4-6, 2010, 10 pages, New York City, NY.

(Continued)

*Primary Examiner* — Usmaan Saeed
*Assistant Examiner* — Paul Kim
(74) *Attorney, Agent, or Firm* — Dave Ream; Tom Wong; Micky Minhas (57) ABSTRACT

Methods and systems are provided for using a hybrid-distribution system to identify relevant documents based on a search query. A group of documents is assigned to a particular segment. The group of documents is indexed both by atom and by document to form a reverse index and a forward index. Both indexes are divided amongst each node in that segment so that each node is responsible for storing and accessing a different portion of both the reverse and forward indexes. The reverse index portion is accessed on each of a first set of nodes to identify a first set of documents that is relevant to a particular search query. Document identifications associated with the first set of documents are used to identify a second set of nodes that access their forward index portions to limit the number of relevant documents to a second set of documents.

20 Claims, 7 Drawing Sheets

(56) References Cited

U.S. PATENT DOCUMENTS

| | | | |
|---|---|---|---|
| 5,983,216 A | 11/1999 | Kirsch et al. | |
| 6,167,397 A | 12/2000 | Jacobson et al. | |
| 6,173,298 B1 | 1/2001 | Smadja | |
| 6,507,829 B1 | 1/2003 | Richards et al. | |
| 6,571,251 B1 | 5/2003 | Koski et al. | |
| 6,704,729 B1 | 3/2004 | Klein et al. | |
| 6,807,545 B1 | 10/2004 | VanDamme | |
| 6,901,411 B2 | 5/2005 | Li et al. | |
| 6,999,958 B2 | 2/2006 | Carlson et al. | |
| 7,039,631 B1 | 5/2006 | Finger, II | |
| 7,072,889 B2 | 7/2006 | Ogawa | |
| 7,152,064 B2 * | 12/2006 | Bourdoncle et al. | |
| 7,305,385 B1 | 12/2007 | Dzikiewicz et al. | |
| 7,330,857 B1 | 2/2008 | Svingen et al. | |
| 7,421,418 B2 | 9/2008 | Nakano | |
| 7,433,893 B2 | 10/2008 | Lowry | |
| 7,593,934 B2 | 9/2009 | Li et al. | |
| 7,596,745 B2 | 9/2009 | Dignum et al. | |
| 7,693,813 B1 | 4/2010 | Cao et al. | |
| 7,702,614 B1 | 4/2010 | Shah et al. | |
| 7,761,407 B1 | 7/2010 | Stern | |
| 7,765,215 B2 | 7/2010 | Hsu et al. | |
| 7,783,644 B1 | 8/2010 | Petrou et al. | |
| 7,792,846 B1 | 9/2010 | Raffill et al. | |
| 7,930,290 B2 | 4/2011 | Farouki | |
| 7,966,307 B2 | 6/2011 | Iwayama et al. | |
| 7,984,043 B1 | 7/2011 | Waas | |
| 8,010,482 B2 | 8/2011 | Andersen et al. | |
| 8,166,203 B1 | 4/2012 | Yang | |
| 8,255,386 B1 | 8/2012 | Annau et al. | |
| 8,527,523 B1 | 9/2013 | Ravid | |
| 2002/0032772 A1 | 3/2002 | Olstad | |
| 2002/0091671 A1 | 7/2002 | Prokoph | |
| 2002/0129015 A1 | 9/2002 | Caudill et al. | |
| 2003/0191737 A1* | 10/2003 | Steele et al. | 707/1 |
| 2003/0217052 A1 | 11/2003 | Rubenczyk et al. | |
| 2004/0044952 A1 | 3/2004 | Jiang et al. | |
| 2004/0098399 A1 | 5/2004 | Risberg et al. | |
| 2004/0133557 A1 | 7/2004 | Wen et al. | |
| 2004/0139167 A1 | 7/2004 | Edsall et al. | |
| 2005/0010560 A1 | 1/2005 | Altevogt et al. | |
| 2005/0038866 A1 | 2/2005 | Noguchi et al. | |
| 2005/0210383 A1 | 9/2005 | Cucerzan | |
| 2005/0283526 A1 | 12/2005 | O'Neal et al. | |
| 2006/0018551 A1 | 1/2006 | Patterson | |
| 2006/0020571 A1 | 1/2006 | Patterson | |
| 2006/0080311 A1 | 4/2006 | Potok et al. | |
| 2006/0155690 A1 | 7/2006 | Wen et al. | |
| 2006/0195440 A1 | 8/2006 | Burges et al. | |
| 2006/0248066 A1 | 11/2006 | Brewer | |
| 2007/0040813 A1 | 2/2007 | Kushler et al. | |
| 2007/0067274 A1 | 3/2007 | Han et al. | |
| 2007/0078653 A1 | 4/2007 | Olsen | |
| 2007/0150467 A1 | 6/2007 | Beyer et al. | |
| 2007/0250501 A1 | 10/2007 | Grubb | |
| 2008/0027912 A1 | 1/2008 | Liu et al. | |
| 2008/0027920 A1 | 1/2008 | Schipunov et al. | |
| 2008/0028010 A1 | 1/2008 | Ramsey | |
| 2008/0059187 A1 | 3/2008 | Roitblat et al. | |
| 2008/0059489 A1 | 3/2008 | Han et al. | |
| 2008/0082520 A1 | 4/2008 | Bohn et al. | |
| 2008/0114750 A1 | 5/2008 | Saxena et al. | |
| 2008/0208836 A1 | 8/2008 | Zheng et al. | |
| 2008/0216715 A1 | 9/2008 | Langford | |
| 2008/0294634 A1 | 11/2008 | Fontoura et al. | |
| 2009/0012956 A1 | 1/2009 | Wen et al. | |
| 2009/0070322 A1 | 3/2009 | Salvetti et al. | |
| 2009/0083262 A1 | 3/2009 | Chang et al. | |
| 2009/0106232 A1 | 4/2009 | Burges | |
| 2009/0112843 A1* | 4/2009 | Hsu et al. | 707/5 |
| 2009/0132515 A1 | 5/2009 | Lu et al. | |
| 2009/0132541 A1 | 5/2009 | Barsness et al. | |
| 2009/0187550 A1 | 7/2009 | Mowatt et al. | |
| 2009/0187555 A1 | 7/2009 | Liu et al. | |
| 2009/0216715 A1* | 8/2009 | Dexter | 707/3 |
| 2009/0216740 A1 | 8/2009 | Ramakrishnan et al. | |
| 2009/0248669 A1 | 10/2009 | Shetti et al. | |
| 2009/0254523 A1 | 10/2009 | Lang et al. | |
| 2009/0271385 A1 | 10/2009 | Krishnamoorthy et al. | |
| 2009/0327274 A1 | 12/2009 | Kejariwal et al. | |
| 2010/0057718 A1 | 3/2010 | Kulkarni | |
| 2010/0082617 A1 | 4/2010 | Liu et al. | |
| 2010/0114561 A1 | 5/2010 | Yasin | |
| 2010/0121838 A1 | 5/2010 | Tankovich et al. | |
| 2010/0138426 A1 | 6/2010 | Nakayama et al. | |
| 2010/0179933 A1 | 7/2010 | Bai et al. | |
| 2010/0198857 A1 | 8/2010 | Metzler et al. | |
| 2010/0205172 A1 | 8/2010 | Luk | |
| 2010/0318516 A1 | 12/2010 | Kolen et al. | |
| 2010/0318519 A1 | 12/2010 | Hadjieleftheriou et al. | |
| 2011/0093459 A1 | 4/2011 | Dong et al. | |
| 2011/0191310 A1 | 8/2011 | Liao et al. | |
| 2012/0130925 A1 | 5/2012 | Risvik et al. | |

FOREIGN PATENT DOCUMENTS

| | | |
|---|---|---|
| CN | 1728143 | 2/2006 |
| CN | 101246492 A | 8/2008 |
| CN | 101322125 | 12/2008 |
| CN | 101388026 | 3/2009 |
| CN | 101393565 | 3/2009 |
| CN | 101437031 A | 5/2009 |
| CN | 101583945 | 11/2009 |
| CN | 101635741 A | 1/2010 |
| CN | 101950300 A | 1/2011 |
| EP | 0952535 A | 10/1999 |

OTHER PUBLICATIONS

Tandon, et al., "Information Extraction from Web-Scale N-Gram Data," In: Special Interest Group on Information Retrieval Web N-Gram Workshop, 2010, 8 pages.

Zobel, et al., "Finding Approximate Matches in Large Lexicons," Software—Practice and Experience, Mar. 1995, by John Wiley & Sons, Ltd., pp. 331-345, vol. 25, Issue 3, Australia.

Pike, et al., "Interpreting the Data: Parallel Analysis with Sawzall," In Scientific Programming—Dynamic Grids and Worldwide Computing, vol. 13, Issue 4, 2005, pp. 1-33.

Shah, et al., "Flux: An Adaptive Partitioning Operator for Continuous Query Systems," 19th International Conference on Data Engineering (ICDE'03), 2003, 16 pp.

Tamura, et al., "Parallel Database Processing on a 100 Node PC Cluster: Cases for Decision Support Query Processing and Data Mining," In Proceedings of the 1997 ACM/IEEE conference on Supercomputing (CDROM), 1997, 16 pp.

Zhaohui Zheng, et al. Query-Level Learning to Rank Using Isotonic Regression—Pub. Date: Sep. 26, 2008 http://ieeexplore.ieee.org/stamp/stamp.jsp?arnumber=04797684.

Gui-Rong Zue Ke Zhou, et al., Learning to Rank with Ties—Pub. Date: Jul. 24, 2008 http://sites.google.com/site/archkzhou/home/p275-zhou.pdf.

Tao Qin, et al., Learning to Rank Relational Objects and Its Application to Web Search—Pub. Date: Apr. 25, 2008 http://www2008.org/papers/pdf/p407-qinA.pdf.

Andrew Cencini, SQL Server 2005 Full-Text Search: Internals and Enhancements—Pub. Date: Dec. 2003 http://msdn.microsoft.com/en-us/library/ms345119%28SQL.90%29.aspx.

Mark Bennett, Do You Need Synthetic Tokens? (part 2)—Published Date: Dec. 2009 http://www.ideaeng.com/tabld/98/itemId/209/Do-You-Need-Synthetic-Tokens-part-2.aspx.

Steven Burrows, et al., Efficient and Effective Plagiarism Detection for Large Code Repositories—Pub. Date: 2004 http://www.cs.berkeley.edu/~benr/publications/auscc04/papers/burrows-auscc04.pdf.

Andrew Kane, Simulation of Distributed Search Engines: Comparing Term, Document and Hybrid Distribution—Published Date: Feb. 18, 2009 http://www.cs.uwaterloo.ca/research/tr/2009/CS-2009-10.pdf.

Lei Zheng, et al., Document-Oriented Pruning of the Inverted Index in Information Retrieval Systems—Pub. Date: 2009 http://ieeexplore.ieee.org/stamp/stamp.jsp?tp=&arnumber=5136730.

(56) References Cited

OTHER PUBLICATIONS

Ahmad Abusukhon, et al., Comparison Between Document-based, Term-based and Hybrid Partitioning—Pub. Date: Aug. 4, 2008 http://ieeexplore.ieee.org/stamp/stamp.jsp?arnumber=04664324.
Chunqiang Tang, et al., Hybrid Global-Local Indexing for Efficient Peer-To-Peer Information Retrieval—Pub. Date: 2004 http://citeseerx.ist.psu.edu/viewdoc/download?doi=10.1.1.81.5268&rep=rep1&type=ps.
Kuansan Wang, et al., Multi-Style Language Model for Web Scale Information Retrieval—Pub. Date: Jul. 23, 2010 http://research.microsoft.com/en-us/um/people/jfgao/paper/fp580-wang.pdf.
David Carmel, et al., Juru at TREC 10—Experiments with Index Pruning RD—Retrieved Date: Aug. 12, 2010 http://citeseerx.ist.psu.edu/viewdoc/download?doi=10.1.1.81.6833&rep=rep1&type=pdf.
Using and storing the index—Retrieved Date: Aug. 13, 2010 http://www.cs.princeton.edu/courses/archive/spring10/cos435/Notes/indexing_topost.pdf.
Matthias Bender, et al., Design Alternatives for Large-Scale Web Search: Alexander was Great, Aeneas a Pioneer, and Anakin has the Force—Retrieved Date: Aug. 16, 2010 http://qid3.mmci.uni-saarland.de/publications/lsds2007.pdf.
Parallel Information Retrieval—Retrieved Date: Aug. 16, 2010 http://www.ir.uwaterloo.ca/book/14-parallel-information-retrieval.pdf.
Diego Puppin, et al., Query-Driven Document Partitioning and Collection Selection—Retrieved Date: Aug. 16, 2010 http://citeseerx.ist.psu.edu/viewdoc/download?doi=10.1.1.101.6421&rep=rep1&type=pdf.
Ohm Sornil, et al., Hybrid Partitioned Inverted Indices for Large-Scale Digital Libraries—Retrieved Date: Aug. 16, 2010 http://ncsi-net.ncsi.iisc.ernet.in/gsdl/collect/icco/index/assoc/HASH472d.dir/doc.pdf.
Non-Final Office Action mailed Jan. 31, 2012, in U.S. Appl. No. 13/045,278.
Non-Final Office Action mailed Apr. 13, 2012 in U.S. Appl. No. 12/951,799.
Non-Final Office Action mailed Apr. 5, 2012 in U.S. Appl. No. 12/951,747.
Non-final Office Action mailed Apr. 11, 2012 in U.S. Appl. No. 12/951,528.
International Search Report and Written Opinion in PCT/US2011/059650, mailed Apr. 10, 2012.
Final Office Action in U.S. Appl. No. 13/045,278, mailed Jul. 19, 2012.
International Search Report and Written Opinion in PCT/US2011/059834, mailed May 23, 2012.
Non-Final Office Action in U.S. Appl. No. 12/951,747, mailed Nov. 1, 2012.
Final Office Action in U.S. Appl. No. 13/072,419, mailed Aug. 9, 2013, 45 pages.
Notice of Allowance in U.S. Appl. No. 12/951,528 mailed Aug. 26, 2013, 33 pages.
Final Office Action in U.S. Appl. No. 12/951,747, mailed Apr. 9, 2013, 16 pages.
Final Office Action in U.S. Appl. No. 12/951,528, mailed Apr. 8, 2013, 22 pages.
Notice of Allowance and Fee(s) Due in U.S. Appl. No. 12/951,747, mailed Dec. 11, 2013, 35 pages.
Non Final Office Action in U.S. Appl. No. 13/932,866, mailed Dec. 20, 2013, 19 pages.
Non-Final Office Action dated Sep. 25, 2012 in U.S. Appl. No. 12/951,528, 15 pages.
Chinese Office Action dated Sep. 16, 2014 in Chinese Application No. 201110373395.6, 6 pages.
Non-Final Office Action dated Aug. 19, 2014 in U.S. Appl. No. 12/951,799, 11 pages.
Final Office Action dated Nov. 2, 2012 in U.S. Appl. No. 12/951,799, 11 pages.
Notice of Allowance dated Mar. 8, 2013 in U.S. Appl. No. 12/951,659, 10 pages.
Chinese Office Action dated Aug. 11, 2014 in Chinese Application No. 201110373345.8, 6 pages.
Non-Final Office Action dated Jan. 15, 2013 in U.S. Appl. No. 13/072,419, 22 pages.
Notice of Allowance dated Apr. 11, 2014 in U.S. Appl. No. 13/932,866, 7 pages.
Notice of Allowance dated Jul. 10, 2015 in U.S. Appl. No. 13/072,419, 16 pages.
Final Office Action dated Mar. 12, 2015 in U.S. Appl. No. 12/951,799, 12 pages.
Non-Final Office Action dated Mar. 25, 2015 in U.S. Appl. No. 13/045,278, 33 pages.
Notice of Allowance dated Nov. 25, 2015 in U.S. Appl. No. 13/045,278, 5 pages.
Non-Final Office Action dated Jan. 29, 2016 in U.S. Appl. No. 12/951,799, 12 pages.
Chinese Office Action dated May 5, 2016 with Search Report dated Apr. 18, 2016 in Chinese Patent Application No. 201210060934.5, 11 pages.
Chinese Office Action dated Jun. 8, 2016 with Search Report dated May 27, 2016 in Chinese Patent Application No. 201210079487.8, 13 pages.

\* cited by examiner

HYBRID-DISTRIBUTION MODEL FOR SEARCH ENGINE INDEXES

CROSS-REFERENCE TO RELATED APPLICATIONS

This application is related by subject matter to the inventions disclosed in the following commonly assigned applications filed on even date herewith: U.S. application Ser. No. 12/951,528, entitled "MATCHING FUNNEL FOR LARGE DOCUMENT INDEX"; U.S. application Ser. No. 12/951,659, entitled "DECOMPOSABLE RANKING FOR EFFICIENT PRECOMPUTING"; U.S. application Ser. No. 12/951,747, entitled "EFFICIENT FORWARD RANKING IN A SEARCH ENGINE"; and U.S. application Ser. No. 12/951,799, entitled "TIERING OF POSTING LISTS IN SEARCH ENGINE INDEX." Each of the aforementioned applications is herein incorporated by reference in its entirety.

BACKGROUND

The amount of information and content available on the Internet continues to grow very fast. Given the vast amount of information, search engines have been developed to facilitate searching for electronic documents. In particular, users may search for information and documents by entering search queries comprising one or more terms that may be of interest to the user. After receiving a search query from a user, a search engine identifies documents and/or web pages that are relevant based on the search query. Because of its utility, web searching, that is, the process of finding relevant web pages and documents for user issued search queries has arguably become the one of the most popular service on the Internet today.

Further, search engines typically use a one-step process that utilizes a search index to identify relevant documents to return to a user based on a received search query. Search engine ranking functions, however, have emerged into very complex functions that can be both time consuming and expensive if used for every document that is indexed. Additionally, the storage of data needed for these complex formulas can also present issues, especially when stored in reverse indexes that are typically indexed by words or phrases. The extraction of relevant data needed for the complex formulas, when stored in reverse indexes, is inefficient.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to the employment of both atom-sharded and document-sharded distribution across the same set of nodes such that each node, or machine, stores both a portion of a reverse index (e.g., sharded by atom) and a portion of a forward index (e.g., sharded by document). A segment may be assigned a group of documents for which it is responsible. The group of documents is indexed both by atom and document so that there is a reverse index and forward index associated with that group of documents. Each segment comprises multiple nodes, and each node may be assigned a different portion of both the reverse and forward indexes. Further, each node is responsible for performing multiple ranking calculations using both the reverse and forward index portions stored thereon. For instance, a preliminary ranking process may utilize the reverse index and a final ranking process may utilize the forward index. These ranking processes form an overall ranking process that is employed to identify the most relevant documents based on a received search query.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted above, embodiments of the present invention provide for nodes that form a segment to each store a portion of a reverse index and a forward index for that segment. For instance, out of a total quantity of documents (e.g., one trillion) that are to be indexed, each segment may be allotted a certain portion of documents such that the segment is responsible for indexing and performing ranking calculations for those documents. The portion of the reverse and forward indexes stored on that particular segment is the complete reverse and forward index with respect to the documents assigned to that segment. Each segment is comprised of multiple nodes, which are essentially machines or computational devices with storage capabilities. An independent portion of the reverse index and forward index are assigned to each node in the segment such that each node may be employed to perform various ranking calculations. As such, each node has stored thereon a subset of the segment's reverse index and the forward index, and is responsible for accessing each in various ranking processes within the segment. For instance, an overall ranking process may comprise a matching phase, a preliminary ranking phase, and a final ranking phase. The matching/preliminary phase may require that those nodes whose reverse indexes have indexed a certain atom from a search query be employed to identify a first set of documents that is relevant to the search query. The first set of documents is a set of documents from the documents allocated to the segment. Subsequently, those nodes whose forward indexes have indexed a document identification associated with a document in the first set of documents may be employed to identify a second set of documents that are even more relevant to the search query. The second of documents, in one embodiment, is a subset of the first set of document. This overall process may be employed to limit a set of documents to those that are found to be relevant so that the final ranking process, which is typically more time consuming and costly than the preliminary ranking process, is employed to rank fewer documents than it would be if ranking every document in the index, whether relevant or not.

Accordingly, in one aspect, an embodiment of the present invention is directed to one or more computer-storage media storing computer-useable instructions that, when used by a computing device, cause the computing device to perform a method for utilizing a hybrid-distribution system for identifying relevant documents based on a search query. The method includes allocating a group of documents to a segment, the group of documents being indexed by atom in a reverse index and indexed by document in a forward index and storing a different portion of the reverse index and the forward index on each of a plurality of nodes that form the segment. Further, the method includes accessing the reverse index portion stored on each of a first set of nodes to identify a first set of documents that is relevant to the search query. The method additionally includes, based on document identifications associated with the first set of documents, accessing the forward index portion stored on each of a second set of nodes to limit a quantity of relevant documents in the first set of documents to a second set of documents.

In another embodiment, an aspect of the invention is directed to one or more computer-storage media storing computer-useable instructions that, when used by a computing device, cause the computing device to perform a method for generating a hybrid-distribution system for a multi process document-retrieval system. The method includes receiving an indication of a group of documents assigned to a segment, the segment comprising a plurality of nodes. For the segment, the method further includes indexing the allocated group of documents by atom to generate a reverse index and indexing the allocated group of documents by document to generate a forward index. The method additionally includes assigning a portion of the reverse index and a portion of the forward index to each of a plurality of nodes that form the segment such that each of the plurality of nodes has stored a different portion of the forward index and a different portion of the reverse index.

A further embodiment of the invention is directed to one or more computer-storage media storing computer-useable instructions that, when used by a computing device, cause the computing device to perform a method for utilizing a hybrid-distribution system for identifying relevant documents based on a search query. The method includes receiving a search query, identifying one or more atoms in the search query, and communicating the one or more atoms to a plurality of segments that have each been assigned a group of documents that is indexed both by atom and by document such that a reverse index and a forward index are generated and stored at each of the plurality of segments. Each of the plurality of segments is comprised of a plurality of nodes that are each assigned a portion of the forward index and the reverse index. Based on the one or more atoms, the method identifies a first set of nodes at a first segment whose reverse index portions contain at least one of the one or more atoms from the search query. Additionally, the method includes accessing the reverse index portion stored at each of the first set of nodes to identify a first set of documents that is found to be relevant to the one or more atoms and based on document identifications associated with the first set of documents, identifying a second set of nodes whose forward index portions contain one or more of the document identifications associated with the first set of documents. The method also includes accessing the forward index portion stored at each of the second set of nodes to identify a second set of documents that is a subset of the first set of documents.

Figure 1:
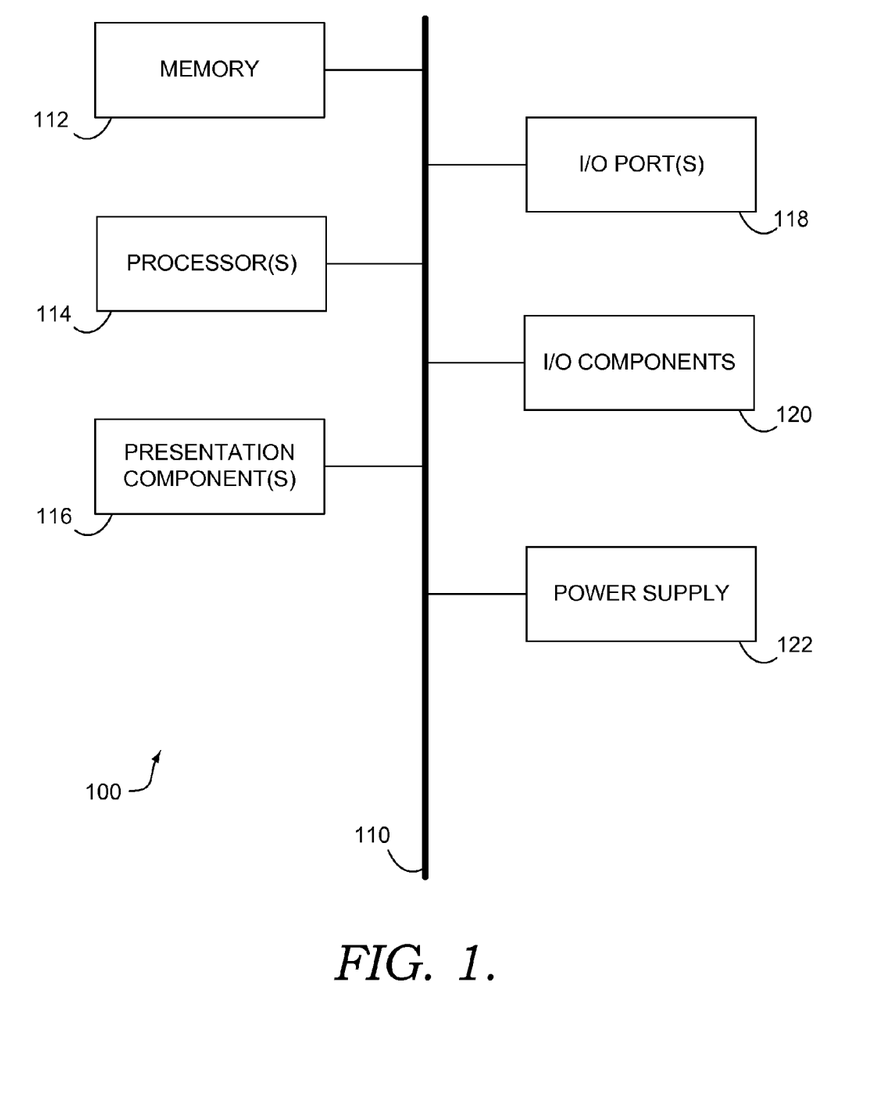
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer-storage media and communication media. Computer-storage media includes both volatile and nonvolatile, removable and non-removable media implemented in any method or technology for storage of information such as computer-readable instructions, data structures, program modules or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
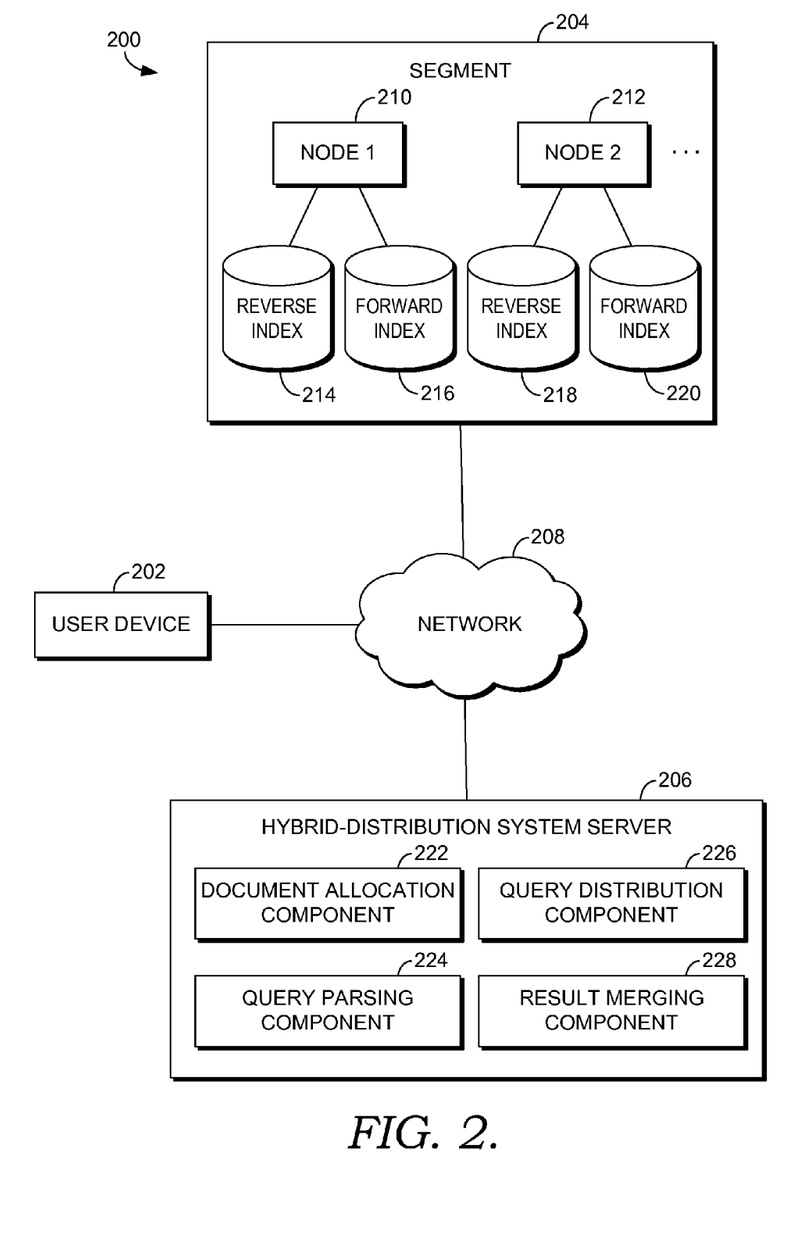
FIG. 2 is a block diagram of an exemplary system in which embodiments of the invention may be employed.

Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 includes a user device 202, a segment 204, and a hybrid-distribution system server 206. Each of the components shown in FIG. 2 may be any type of computing device, such as computing device 100 described with reference to FIG. 1, for example. The components may communicate with each other via a network 208, which may include, without limitation, one or more local area networks (LANs) and/or wide area networks (WANs). Such networking environments are commonplace in offices, enterprise-wide computer networks, intranets, and the Internet. It should be understood that any number of user devices, segments, and hybrid-distribution system servers may be employed within the system 200 within the scope of the present invention. Each may comprise a single device or multiple devices cooperating in a distributed environment. For instance, the segment may comprise multiple devices arranged in a distributed environment that collectively provide the functionality of the segment 204 described herein. Additionally, other components not shown may also be included within the system 200, while components shown in FIG. 2 may be omitted in some embodiments.

The user device 202 may be any type of computing device owned and/or operated by an end user that can access network 208. For instance, the user device 202 may be a desktop computer, a laptop computer, a tablet computer, a mobile device, or any other device having network access. Generally, an end user may employ the user device 202 to, among other things, access electronic documents by submitting a search query to a search engine. For instance, the end user may employ a web browser on the user device 202 to access and view electronic documents stored in the system.

The segment 204 typically comprises multiple nodes, also termed leaves. In FIG. 2, two nodes are illustrated, including node 1, numbered 210, and node 2, numbered 212. Although two nodes are illustrated in the embodiment of FIG. 2, segments may comprises many more nodes than two (e.g., 10, 40, 100). Two nodes are illustrated for exemplary purposes only. Each segment, such as the segment 204, is allotted a group of documents that it is responsible for. As such, a reverse index and a forward index are generated and stored at the segment 204. While the reverse index and forward index for a particular segment may be generated at the segment 204 itself, in an alternative embodiment, the indexes are generated at some other location or on some other computing device and sent to the segment 204. Further, once the reverse index and the forward index are generated based on the group of documents allotted to the segment 204, both indexes are divided into portions. In one embodiment, the number of portions is equivalent to the number of nodes associated with a particular segment. Therefore, in the case of 40 nodes in a particular segment, both indexes are portioned 40 ways such that each node is responsible for a different portion of each of the reverse index and the forward index. As shown, node 1 has a reverse index portion 214 and a forward index portion 216. Node 2 also has a reverse index portion 218 and a forward index portion 220. While shown separate from the nodes, in one embodiment, the indexes are stored on the node itself. In any case, each node is responsible for a portion of the reverse index and forward index that are indexed based on the group of documents assigned to that segment.

As mentioned, an index may be indexed or sharded by atom (reverse index) or sharded by document (forward index). As used herein, sharding refers to the process of indexing a set of documents, whether by atom or by document. There are pros and cons to using each approach separately without the other. For instance, when sharding by document, the pros include the isolation of processing between shards such that only merging of results is needed. Further, per-document information is easily aligned with the matching. Even further, network traffic is small. To the contrary, the cons include that every shard is needed to process any particular query. A minimum of O(KN) disk seeks are needed for a K atom query on N shards if the reverse index data is placed on a disk. When sharding by atom, the pros include the reduced computing such that only K shards are needed to process a K atom query. O(K) disk seeks are required for a K atom query if the reverse index data is placed on a disk. But, to the contrary, the cons include the need for connected processing such that all shards storing atoms which participate in a query need to collaborate. Network traffic is significant, in addition to per-document information not being easily managed. Embodiments of the present invention requires less management of per-document data than traditional approaches. Reasons for this include that some scores are precomputed and scored in the indexes, such as the reverse index, and further refinement and filtering of documents also happens subsequent to the matching phase (L0). As such, the cons described above are greatly reduced with respect to management of per-document data.

Further, each node in a particular segment is capable of performing various functions, including ranking functions that allow for relevant search results to be identified. In some embodiments, the search engine may employ a staged process to select search results for a search query, such as the staged approach described in U.S. patent application Ser. No. 12/951,528, entitled "MATCHING FUNNEL FOR LARGE DOCUMENT INDEX." Here, each node may be capable of employing multiple stages of an overall ranking process. An exemplary ranking process is described below, but is simply one example of ranking processes that may be employed by each node. An overall ranking process may be employed when a search query is received to pair the quantity of matching documents down to a manageable size. When a search query is received, the search query is analyzed to identify atoms. The atoms are then used during the various stages of the overall ranking process. These stages may be referred to as the L0 stage (matching stage) to query the search index and identify an initial set of matching documents that contain the atoms from the search query. This initial process may reduce the number of candidate documents from all documents indexed in the search index to those documents matching the atoms from the search query. For instance, a search engine may search through millions or even trillions of documents to determine those that are most relevant to a particular search query. Once the L0 matching stage is complete, the number of candidate documents is greatly reduced. Many algorithms for locating the most relevant documents, however, are costly and time-consuming. As such, two other stages may be employed, including a preliminary ranking stage and a final ranking stage.

The preliminary ranking stage, also termed the L1 stage, employs a simplified scoring function used to compute a preliminary score or ranking for candidate documents retained from the L0 matching stage described above. The preliminary ranking component 210, as such, is responsible for providing preliminary rankings for each of the candidate documents retained from the L0 matching stage. Alternatively, candidate documents may be scored, and as such given absolute numbers instead of a ranking. The preliminary ranking stage is simplified when compared to the final ranking stage as it employs only a subset of the ranking features used by the final ranking stage. For instance, one or more, but in some embodiments not all, of the ranking features used in the final ranking stage are employed by the preliminary ranking stage. Additionally, features not employed by the final ranking stage may be employed by the preliminary ranking stage. In embodiments of the present invention, the ranking features used by the preliminary ranking stage do not have atom-interdependencies, such as term closeness and term co-occurrence. For example, the ranking features used in the preliminary ranking stage may include, for exemplary purposes only, static features and dynamic atom-isolated components. Static features, generally, are those components that only look into features that are query-independent. Examples of static features include page rank, spam ratings of a particular web page, etc. Dynamic atom-isolated components are components that only look at features that are related to single atoms at a time. Examples may include, for instance, BM25f, frequency of a certain atom in a document, location (context) of the atom in the document (e.g., title, URL, anchor, header, body, traffic, class, attributes), etc.

Once the number of candidate documents has again been reduced by the preliminary ranking stage, the final ranking stage, also termed the L2 stage, ranks the candidate documents provided to it by the preliminary ranking stage. The algorithm used in conjunction with the final ranking stage is a more expensive operation with a larger number of ranking features when compared to the ranking features used in the preliminary ranking stage. The final ranking algorithm, however, is applied to a much smaller number of candidate documents. The final ranking algorithm provides a set of ranked documents, and search results are provided in response to the original search query based on the set of ranked documents. In some embodiments, the final ranking stage as described herein may employ a forward index, as described in U.S. patent application Ser. No. 12/951,747, entitled "EFFICIENT FORWARD RANKING IN A SEARCH ENGINE."

Returning to FIG. 2, the hybrid-distribution system server 206 is comprised of a document allocation component 222, a query parsing component 224, a query distribution component 226, and a result merging component 228. The document allocation component 222 is generally responsible for allocating documents to the various segments used in a given ranking system. For exemplary purposes only, if there are 100 million documents in need of indexing and there are 100 segments available, each segment may be allotted 1 million documents. Or, on a larger scale, if there are 1 trillion documents in need of indexing and there are 100,000 segments available, each segment may be allotted 10 million documents. The documents may be allotted evenly between the segments as demonstrated by the examples above, or may be divided in a different way such that each segment does not have the exact same number of documents for which it is responsible.

When a search query is received via a user interface on the user device 202, for instance, the query parsing component 224 operates to reformulate the query. The query is reformulated from its free text form into a format that facilitates querying the search indexes, such as the reverse indexes and forward indexes, based on how data is indexed in the search indexes. In embodiments, the terms of the search query are parsed and analyzed to identify atoms that may be used to query the search indexes. The atoms may be identified using similar techniques that were used to identify atoms in documents when indexing the documents in the search indexes. For instance, atoms may be identified based on the statistics of terms and query distribution information. The query parsing component 224 may provide a set of conjunction of atoms and cascading variants of these atoms.

An atom, or an atomic unit, as used herein, may refer to a variety of units of a query or a document. These units may include, for example, a term, an n-gram, an n-tuple, a k-near n-tuple, etc. A term maps down to a single symbol or word as defined by the particular tokenizer technology being used. A term, in one embodiment is a single character. In another embodiment, a term is a single word or grouping of words. An n-gram is a sequence of "n" number of consecutive or almost consecutive terms that may be extracted from a document. An n-gram is said to be "tight" if it corresponds to a run of consecutive terms and is "loose" if it contains terms in the order they appear in the document, but the terms are not necessarily consecutive. Loose n-grams are typically used to represent a class of equivalent phrases that differ by insignificant words (e.g., "if it rains I'll get wet" and "if it rains then I'll get wet"). An n-tuple, as used herein, is a set of "n" terms that co-occur (order independent) in a document. Further, a k-near n-tuple, as used herein, refers to a set of "n" terms that co-occur within a window of "k" terms in a document. Thus, an atom is generally defined as a generalization of all of the above. Implementations of embodiments of the present invention may use different varieties of atoms, but as used herein, atoms generally describes each of the above-described varieties.

The query distribution component 226 is essentially responsible for receiving a submitted search query and distributing it amongst the segments. In one embodiment, every search query is distributed to every segment such that each segment provides a preliminary set of search results. For instance, when a segment receives a search query, the segment or a component within the segment determines which nodes will be tasked with performing a preliminary ranking function that utilizes a reverse index portion stored on the nodes. In one case, the selected nodes that are a part of a first set of nodes are those whose reverse index has indexed one or more of the atoms that have been parsed from the search query, as described above. As such, when the search query is reformulated, one or more atoms are identified and sent to each segment. Each of the first set of nodes returns a first set of documents that are found to be relevant to the search query based on a preliminary ranking function, as briefly described above. Subsequently, a second set of nodes is determined. In one embodiment, each of these nodes has stored in its respective forward index at least one of the documents in the first set of documents. Each of the second set of nodes performs a final ranking function using forward index data and other considerations and as a result, a second set of documents is identified. In one embodiment, each of the documents in the second set is included in the first set, as the document identifications associated with the first set of documents are used in the final ranking stage.

The result merging component 228 is given the search results (e.g., document identifications and snippets) from each segment and from those results, a merged and final search results list is formed. There are various ways that the final search results list is formed, including simply removing any duplicate documents and putting each document in a list in an order determined by the final rankings. In one embodiment, a component similar to the result merging component 228 is present on each segment such that the results produced by each node are merged into a single list at the segment before that list is sent to the result merging component 228.

Figure 3:
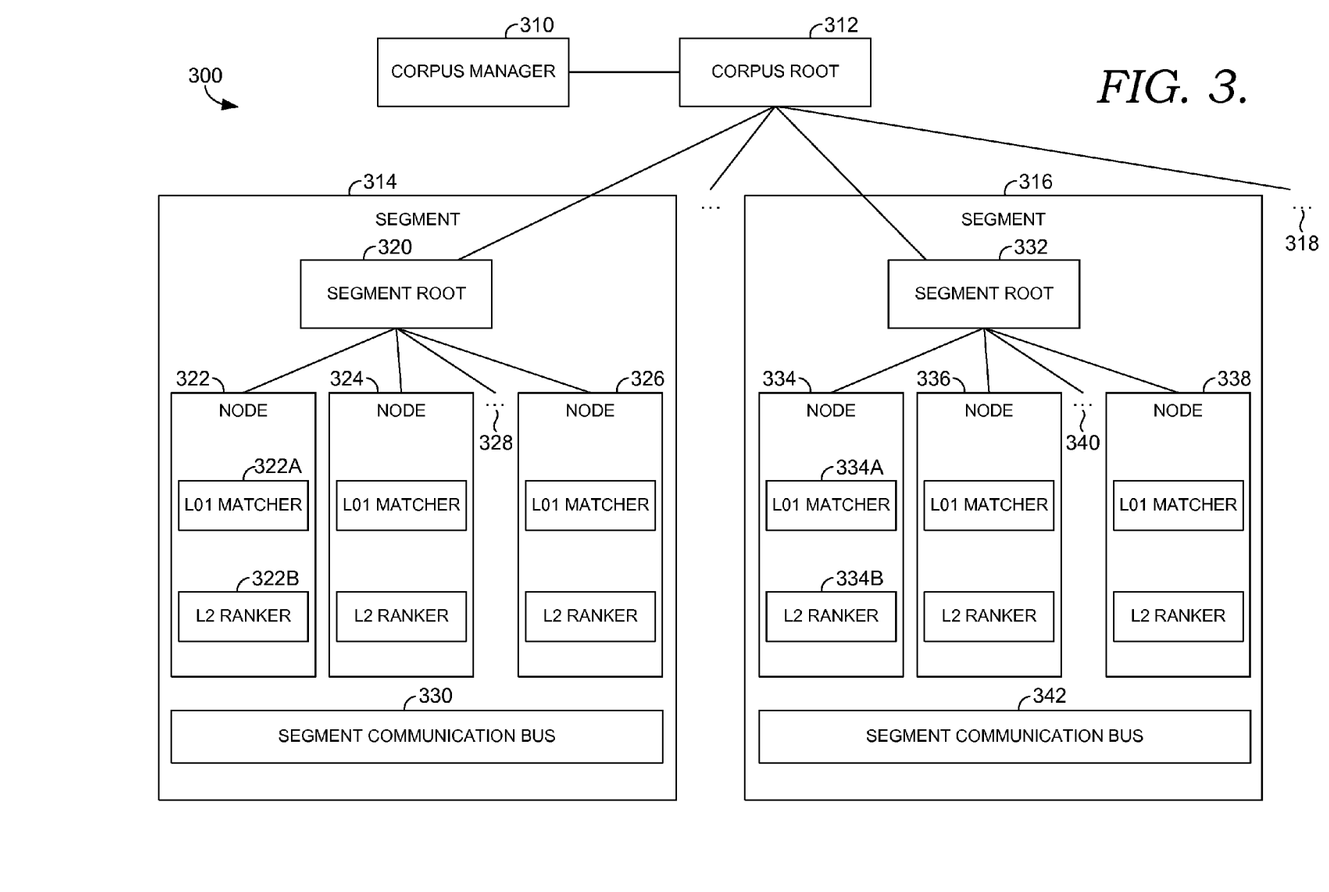
FIG. 3 is an exemplary diagram of a hybrid-distribution system, in accordance with embodiments of the present invention.

Turning now to FIG. 3, an exemplary diagram is shown of a hybrid-distribution system 300, in accordance with embodiments of the present invention. FIG. 3 illustrates various components, including a corpus manager 310, a corpus root 312, and two segments, segment 314 and segment 316. More than two segments may be provided, as indicated by ellipsis 318. The corpus manager 310 holds the state of which processes serve which shard of the forward index and reverse index. It further holds the temperature and state of each of the processes. This data is used to generate the set of processes to use for federating the query out to the different segments. The corpus root 312 is a top-level root process that also performs query planning functions. The corpus root 312 will scatter the query across all the required segments and gather and merge results, and may include custom logic. Each segment has a segment root, such as segment root 320 and segment root 322. A segment root serves as process for federation of queries and aggregation of results from the processed being federated. The segment root 322 is likely to be a dynamic process reassigned to the leaf or node most optimal for final query assembly.

As shown, each segment root is comprised of multiple nodes. Because of space constraints, three nodes are illustrated for segment root 320 and segment root 332. Segment root 320 is comprised of node 322, node 324, and node 326. Ellipses 328 indicates that more than three nodes are contemplated to be within the scope of the present invention. Segment root 334 comprises node 334, node 336, and node 338. As any number of nodes may comprise a segment root, ellipses 340 indicates any additional quantity of nodes. As mentioned, each node is a machine or computational device that is capable of performing multiple calculations, such as ranking functions. For instance, in one embodiment, each node comprises an L01 matcher 322A and an L2 ranker 322B, as shown at node 322. Similarly, node 334 comprises an L01 matcher 334A and an L2 ranker 334B. These are described in more detail above, but the L0 matching and L1 ranking phases (preliminary ranking phase) of an overall ranking process may be combined and collectively called the L01 matcher. As each of the nodes comprises an L01 matcher and an L2 ranker, each node must also have stored a portion of a reverse index and forward index, as the L01 matcher, in one embodiment, utilizes a reverse index and the L2 ranker utilizes a forward index. As mentioned, each of the nodes may be assigned a portion of the reverse and forward indexes that belong to the segment. The segment communication bus 330 associated with segment 314 and the segment communication bus 342 associated with segment 316 allow for each of the nodes to communicate when necessary, such as with the segment root.

Figure 4:
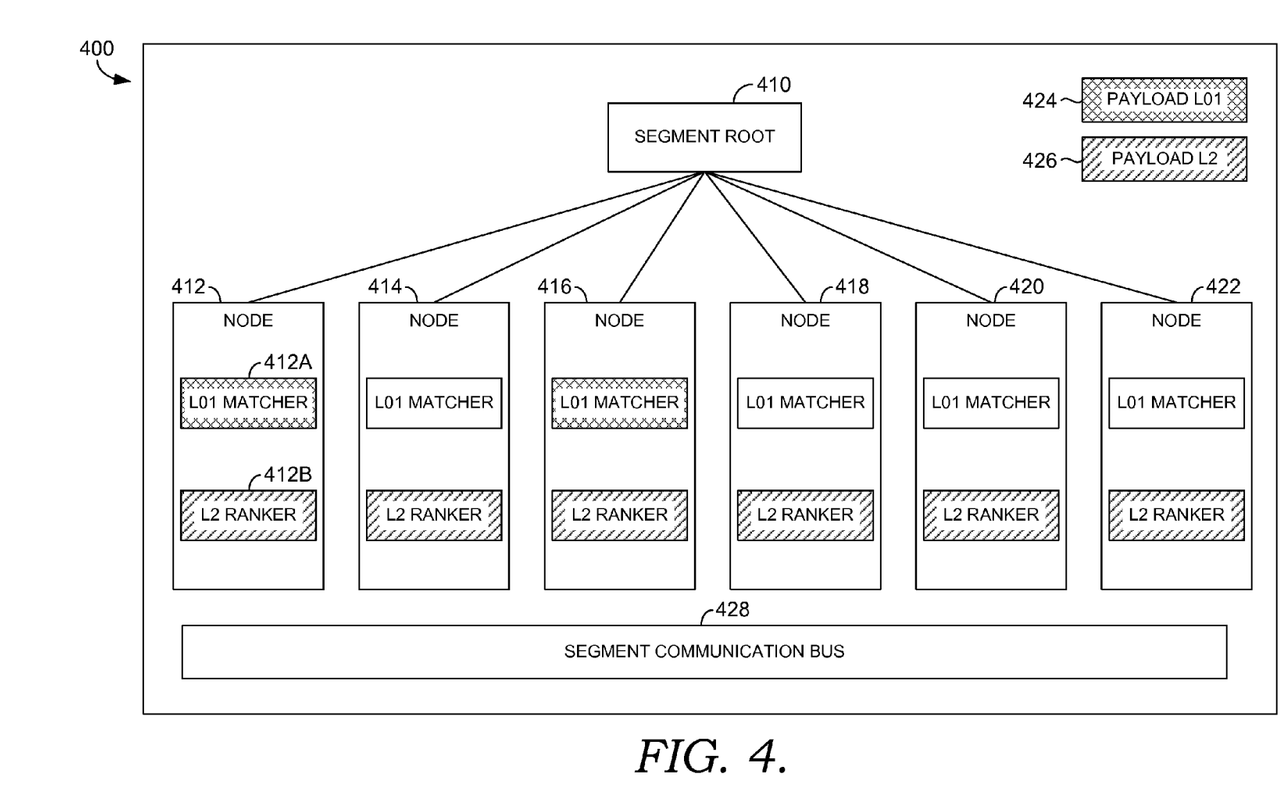
FIG. 4 is an exemplary diagram of a hybrid-distribution system illustrating payload requirements, in accordance with embodiments of the present invention.

FIG. 4 is an exemplary diagram of a hybrid-distribution system 400 illustrating payload requirements, in accordance with embodiments of the present invention. System 400 is an illustration of a single segment root 410 having multiple nodes. Here, six nodes are illustrated (including nodes numbered 412, 414, 416, 418, 420, and 422). Although six nodes are illustrated, any number may be utilized to carry out embodiments of the present invention. As previously indicated, each node has the functionality to perform various ranking calculations, including those in a matching stage (L0), a preliminary ranking stage (L1), and a final ranking stage (L2). As such, node 412, for example, has both an L01 matcher 412A for the L0 and L1 stages described herein and an L2 ranker 412B for the L2 stage described herein. The payload for the different stages, however, may greatly differ. To better illustrate this, the payload for the L01 matcher is shown in a first pattern, as indicated by numeral 424, and the payload for the L2 matcher is shown in a second pattern, as indicated numeral 426.

The group of documents that is allocated to a particular segment is indexed or sharded both by atom (reverse index) and by document (forward index). These indexes are divided into portions equal to the number of nodes that comprise that particular segment. In one embodiment, there are forty nodes, and thus each of the reverse index and the forward index is divided into forty portions and stored at each of the respective nodes. When a search query is submitted to a search engine, the query is sent to each segment. It is the segment's responsibility to identify a first set of nodes whose reverse index has one or more of the atoms from the query indexed. Using this method, if the query is parsed into two atoms, for instance "William" and "Shakespeare" from the query "William Shakespeare," the most number of nodes in a segment that would be engaged for the L01 matcher would be two. This is shown in FIG. 4, as the L01 matcher associated with node 412 and node 416 are the only two that are identified for use in the L01 matching process. Since the documents assigned to each segment are indexed by atom, the each atom is indexed only once in the reverse index such that any particular atom is present in only one of the reverse index portions allocated to the nodes of that segment. In an exemplary scenario, once the first set of nodes is identified, the atom from the search query that matches the atom in the reverse index is sent to the appropriate node. That node performs many computations such that a set of documents is identified. This first set of documents, in one embodiment, contains those documents that have received the highest ranking from the preliminary ranking phase.

This first set of documents is collected at the segment root 410 from each of the nodes from the first set of nodes, including nodes 412 and 416. These results are combined in any of a number of ways so that the segment root 410 can next identify a second set of nodes that will be used in conjunction with the final ranking stage. As shown, each L2 ranker is employed in the final ranking stage, or the L2 stage. This is because each node has stored a portion of the forward index for that segment, and as such there is a good chance that most or all forward indexes will need to be accessed in the final stage of ranking. In the final ranking stage, each node in the second set of nodes is given the document identification that it contains in its forward index so that the node can rank that document based on, at least, data found in the forward index. Because most or all of the nodes are employed in the final ranking stage, as shown in the system 400 of FIG. 4, the payload for the final ranking stage is typically greater than the payload for the matching/preliminary ranking stage. The segment communication bus 428 allows for the nodes to communicate with other components such as, for example, the segment root 410.

Figure 5:
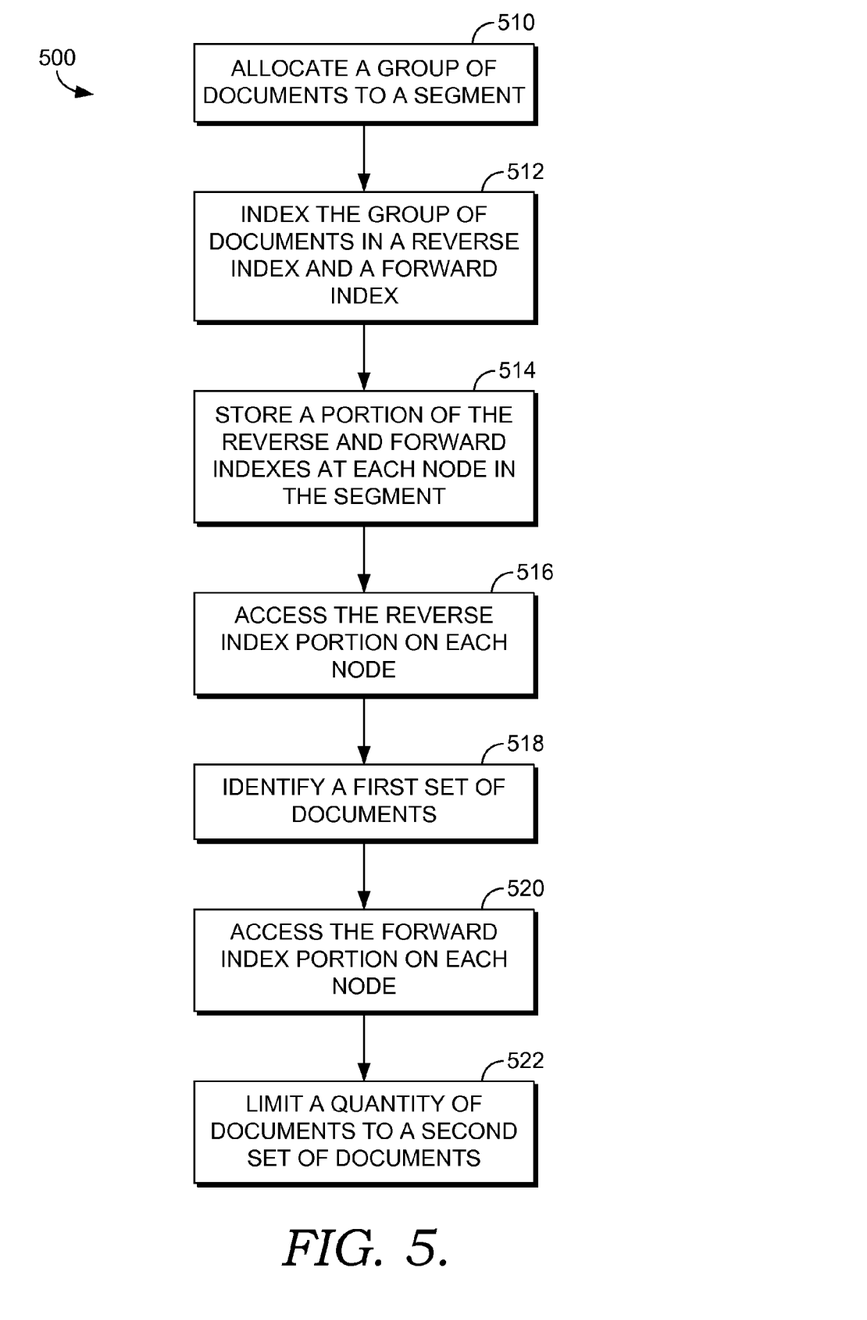
FIG. 5 is a flow diagram showing a method for utilizing a hybrid-distribution system for identifying relevant documents based on a search query, in accordance with embodiments of the present invention.

Referring to FIG. 5, a flow diagram illustrates a method 500 for utilizing a hybrid-distribution system for identifying relevant documents based on a search query, in accordance with embodiments of the present invention. Initially, a group of documents is allocated to a segment at step 510. The group of documents, either prior to or subsequent to being received at the segment, is indexed both by atom in a reverse index and by document in a forward index, indicated by step 512. As such, the documents indexed in the forward index are the documents that comprise the group of documents allocated to that segment and the atoms in the reverse index are parsed from the content of these documents. At step 514, a portion of the reverse index and the forward index is stored at each node in the segment. Generally segments are comprised of a plurality of nodes. Each node is a machine or computation device that is capable of performing ranking computations based on the reverse index portion and forward index portion stored thereon. In one embodiment, each node stores a different or unique portion of the segment's reverse index and forward index.

Step 516 indicates that the reverse index portion is accessed at each node of a first set of nodes. Each node in the first set of nodes has been identified as having indexed one of the atoms of a received search query. A first set of documents is identified at step 518. These documents, in one embodiment, have been ranked using a preliminary ranking function so that the most relevant documents can be identified. This step may correspond, for instance, to the L1 preliminary ranking phase and/or the L0 matching phase. Based on document identifications associated with the documents in the first set of documents, the forward index portion is accessed at each of a second set of nodes, shown at step 520. This step may correspond to the L2 final ranking stage. This effectively limits the quantity of relevant documents for a particular search query. As such, the quantity of documents is limited to a second set of documents, shown at step 522. In many or most instances, the number of nodes in the second set is greater than the nodes in the first set, as described in greater detail above. This is because a search query may have only two atoms such that two nodes, at the most, are needed for the L01 matching phase, but thousands of documents are identified as being relevant to the two atoms of the search query, and as such many more nodes may be employed to use their respective forward indexes to perform the final ranking computations to identify the second set of documents. Further, in embodiments, because the final ranking function utilizes the document identifications produced from the preliminary ranking function, the number of document in the second set is less than the number of documents in the first set such that each document in the second set is also contained in the first set.

In one embodiment, the overall process may involve receiving a search query. One or more atoms in the search query are identified, and once each segment is aware of the one or more atoms, a first set of nodes is identified in the segment that contains at least one of the one or more atoms from the search query. Each of the nodes in the first set of nodes sends a first set of documents (e.g., document identifications) to the segment root, for example, so that the segment root can consolidate (e.g., delete duplicates) and merge the results. A second set of nodes then sends the segment root a second set of document. Similarly, the segment root consolidates and merges the results to generate a final set of documents that is presented to the user in response to the search query.

Figure 6:
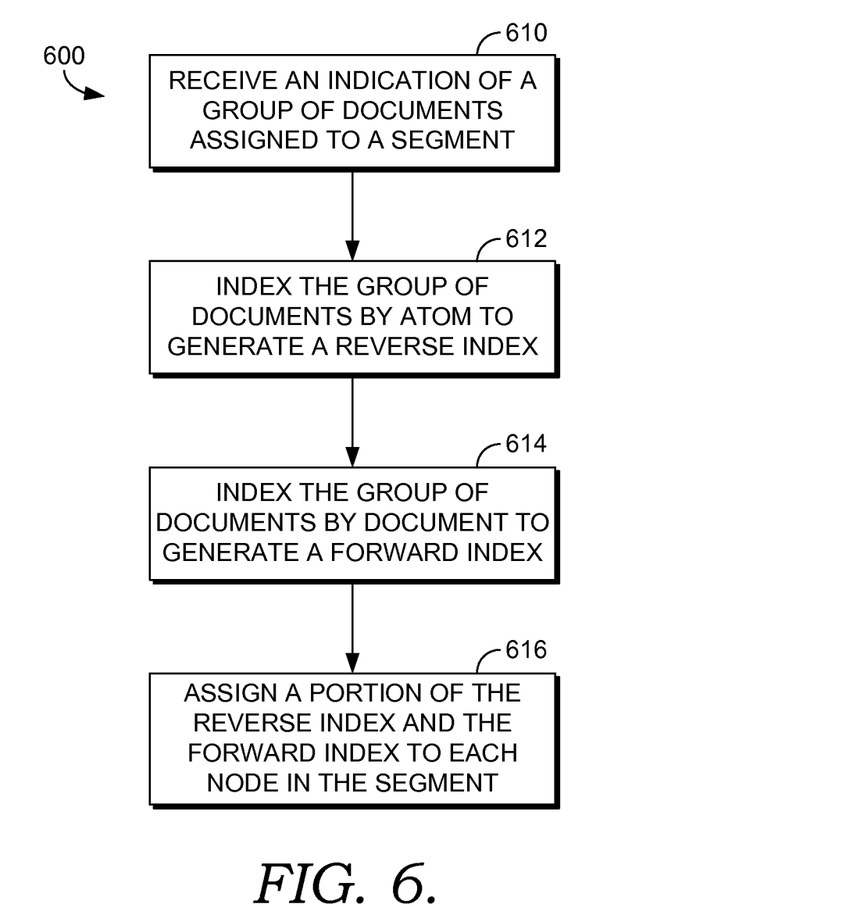
FIG. 6 is a flow diagram showing a method for generating a hybrid-distribution system for a multi process document retrieval system, in accordance with embodiments of the present invention.

Turning to FIG. 6, a flow diagram is illustrated of a method 600 for generating a hybrid-distribution system for a multi-process document retrieval system, in accordance with embodiments of the present invention. At step 610, an indication of a group of documents is received, the group of documents being assigned to a segment that receives the group of documents. The segment comprises multiple nodes (e.g., ten, forty, fifty). The group of documents is indexed by atom to generate a reverse index, shown at step 612. At step 614, the group of document is indexed by document to generate a forward index. At step 616, a portion of the reverse index and a portion of the forward index is assigned to each node that comprises the segment. In embodiments, each node is assigned a different portion of the reverse and forward indexes such that a particular atom is indexed in only one node's forward index within a segment.

In embodiments, at the segment, an indication is received of one or more atoms that have been identified from a search query. A first set of nodes is identified whose reverse index portions include at least one of the one or more atoms. These nodes are each capable of performing various ranking functions. A first set of documents is identified based on the reverse index portions of the first set of nodes. Each node in the first set may produce a first set and send it to the segment root such that the various first sets of nodes can be consolidated and merged. In one instance, the first set of documents is produced by way of a preliminary ranking process of a multistage ranking process that utilizes the reverse index portions stored thereon. Further, a second set of nodes may then be identified whose forward index portions have indexed one or more document identifications corresponding to the first set of documents. A second set of documents may then be identified based, partially, on data stored in the forward index, and may compute features in real-time rather than using pre-computed scores. The second set of documents may be identified based on a final ranking process of a multistage ranking process that utilizes the forward index. Once the second set of documents from each node in the second set of nodes is consolidated and merged, it is also merged with the second sets of documents from all of the other segments so that a final set of documents is formed and returned to the user as search results.

Figure 7:
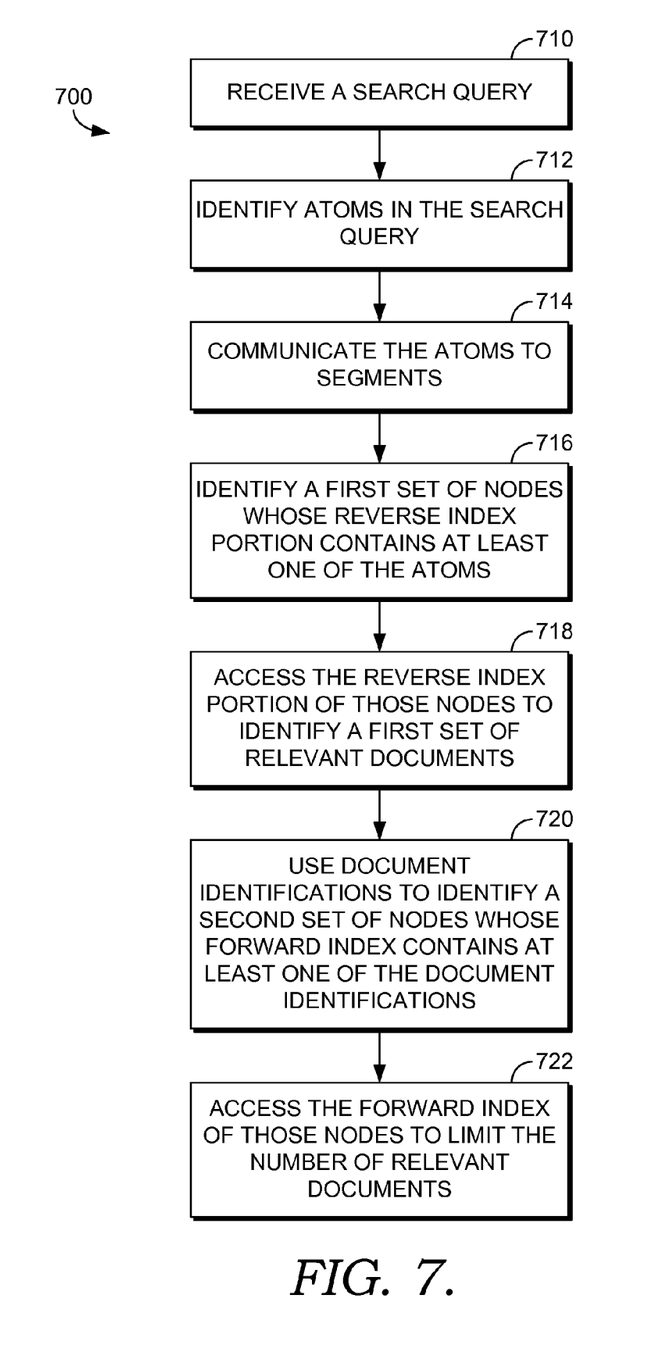
FIG. 7 is a flow diagram showing a method for utilizing a hybrid-distribution system for identifying relevant documents based on a search query, in accordance with embodiments of the present invention.

FIG. 7 is a flow diagram showing a method 700 for utilizing a hybrid-distribution system for identifying relevant documents based on a search query, in accordance with embodiments of the present invention. Initially, at step 710, a search query is received. Atoms in the search query are identified at step 712. At step 714, the atoms are communicated to various segments. Each segment has been assigned a group of documents, the group of documents being indexed both by atom and by document to from a reverse index and a forward index stored at each segment. Each segment is comprised of a plurality of nodes that are each assigned a portion of the forward index and the reverse index. At step 716, a first set of nodes is identified whose reverse index portions contain at least one of the atoms from the search query. At step 718, the reverse index portions of each of the nodes in the first set of nodes is accessed to identify a first set of relevant documents. Based on document identification associated with each document in the first set of documents, a second set of nodes is identified at step 720. Each node in the second set of nodes has stored in its respective forward index portion at least one of the document identifications such that the node can perform a ranking process on each document. The forward index portion at each node in the second set of n odes is accessed at step 722 to limit the number of relevant documents. In one embodiment, each document in the second set of documents is also contained in the first set of documents. Based on the second set of documents, search results are generated (e.g., by compiling the second sets of documents from the plurality of segments) and presented to the user.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-storage media storing computer-useable instructions that, when used by a computing device, cause the computing device to perform a method for utilizing a hybrid-distribution system for identifying relevant documents based on a search query, the method comprising:

allocating a group of documents to a segment, the group of documents being indexed by atom in a reverse index and indexed by document in a forward index wherein atoms in the reverse index are accessed in a matching process and a preliminary ranking process and wherein documents in the forward index are accessed in a final ranking process;

storing a different portion of the reverse index and the forward index on each of a plurality of nodes that form the segment;

first, accessing the reverse index portion stored on each of a first set of nodes having portions of the reverse index;

identifying a first set of documents that is relevant to the search query, wherein the first set of documents is identified as being relevant to the search query by way of the matching process and the preliminary ranking process;

second, based on document identifications associated with the first set of documents, accessing the forward index portion stored on each of a second set of nodes having portions of the forward index;

identifying a second set of documents from the first set of documents, wherein the second set of documents is identified by way of the final ranking process;

limiting a quantity of relevant documents in the first set of documents identified to the second set of documents; and communicating for presentation search results for the search query based on the second set of documents.

2. The computer-storage media of claim 1, wherein a node is a machine that is capable of performing ranking computations based on its stored reverse index portion and forward index portion.

3. The computer-storage media of claim 1, wherein a quantity of nodes in the second set of nodes is greater than the quantity of nodes in the first set of nodes.

4. The computer-storage media of claim 1, wherein the first set of documents is identified as being relevant to the search query by way of the preliminary ranking process that is part of a multistage ranking process, wherein the preliminary ranking process utilizes the reverse index portion.

5. The computer-storage media of claim 4, wherein each document in the second set of documents is contained in the first set of documents.

6. The computer-storage media of claim 5, wherein the second set of documents is identified by the final ranking process that is part of the overall ranking process, wherein the final ranking process utilizes the forward index portion.

7. The computer-storage media of claim 1, further comprising:

receiving the search query;

identifying one or more atoms in the search query; and identifying the first set of nodes in the segment that contains at least one of the one or more atoms.

8. The computer-storage media of claim 1, wherein the forward index portion stored on each node in the second set of nodes contains at least one of the document identifications associated with the first set of documents.

9. The computer-storage media of claim 1, wherein the second set of documents from multiple segments are merged to generate a final set of documents that is presented to the user in response to the search query.

10. A method for utilizing a hybrid-distribution system for identifying relevant documents based on a search query, the method comprising:

allocating a group of documents to a segment, the group of documents being indexed by atom in a reverse index and indexed by document in a forward index, atoms in the reverse index are accessed in a matching process and a preliminary ranking process and documents in the forward index are accessed in a final ranking process;

storing a different portion of the reverse index and the forward index on each of a plurality of nodes that form the segment;

first, accessing the reverse index portion stored on each of a first set of nodes having portions of the reverse index;

identifying a first set of documents that is relevant to the search query, wherein the first set of documents is identified as being relevant to the search query by way of the matching process and the preliminary ranking process;

second, based on document identifications associated with the first set of documents, accessing the forward index portion stored on each of a second set of nodes having portions of the forward index;

identifying a second set of documents from the first set of documents, wherein the second set of documents is identified by way of the final ranking process;

limiting a quantity of relevant documents in the first set of documents identified to the second set of documents; and communicating for presentation search results for the search query based on the second set of documents.

11. The method of claim 10, wherein a node is a machine that is capable of performing ranking computations based on its stored reverse index portion and forward index portion.

12. The method of claim 10, wherein a quantity of nodes in the second set of nodes is greater than the quantity of nodes in the first set of nodes.

13. The method of claim 12, wherein each document in the second set of documents is contained in the first set of documents.

14. The method of claim 10, further comprising:
receiving the search query;
identifying one or more atoms in the search query; and
identifying the first set of nodes in the segment that contains at least one of the one or more atoms.

15. The method of claim 10, wherein the forward index portion stored on each node in the second set of nodes contains at least one of the document identifications associated with the first set of documents.

16. The method of claim 10, wherein the second set of documents from multiple segments are merged to generate a final set of documents that is presented to the user in response to the search query.

17. The method of claim 10, wherein the segment is assigned a corresponding portion of the reverse index and the forward index such that the complete reverse index and forward index of the allocated group of documents is available via the segment.

18. The method of claim 10, wherein the multistage ranking process includes a matching process, the preliminary ranking process, and the final ranking process.

19. A system for utilizing a hybrid-distribution system for identifying relevant documents based on a search query, the system comprising:

a hardware processor and a memory configured for providing computer program instructions to the processor;

a hybrid distribution server configured for:

allocating a group of documents to a segment, the group of documents being indexed by atom in a reverse index and indexed by document in a forward index, atoms in the reverse index are accessed in a matching process and a preliminary ranking process and documents in the forward index are accessed in a final ranking process;

storing a different portion of the reverse index and the forward index on each of a plurality of nodes that form the segment;

first, accessing the reverse index portion stored on each of a first set of nodes having portions of the reverse index;

identifying a first set of documents that is relevant to the search query, wherein the first set of documents is identified as being relevant to the search query by way of the matching process and the preliminary ranking process;

second, based on document identifications associated with the first set of documents, accessing the forward index portion stored on each of a second set of nodes having portions of the forward index;

identifying a second set of documents from the first set of documents, wherein the second set of documents is identified by way of the final ranking process;

limiting a quantity of relevant documents in the first set of documents identified to the second set of documents; and communicating for presentation search results for the search query based on the second set of documents.

20. The system of claim 19, wherein the preliminary ranking process is a simplified scoring function compared to the final ranking process, wherein the preliminary ranking process employs a subset of ranking features used by the final ranking process, the final ranking process using a full set of ranking features.

* * * * *